J. E. WYCKOFF.
BEET HARVESTER.
APPLICATION FILED OCT. 29, 1919.

1,366,997.

Patented Feb. 1, 1921.
2 SHEETS—SHEET 1.

Inventor
Joseph E. Wyckoff
by Nestell and Wallace
his Attorneys

J. E. WYCKOFF.
BEET HARVESTER.
APPLICATION FILED OCT. 29, 1919.

1,366,997.

Patented Feb. 1, 1921.
2 SHEETS—SHEET 2.

Inventor
Joseph E. Wyckoff
by Westall and Wallace
his Attorneys

UNITED STATES PATENT OFFICE.

JOSEPH E. WYCKOFF, OF LOS ANGELES, CALIFORNIA.

BEET-HARVESTER.

1,366,997.　　　　Specification of Letters Patent.　　Patented Feb. 1, 1921.

Application filed October 29, 1919. Serial No. 334,225.

*To all whom it may concern:*

Be it known that I, JOSEPH E. WYCKOFF, a citizen of the United States, residing at Los Angeles, in the county of Los Angeles and State of California, have invented new and useful Improvements in Beet-Harvesters, of which the following is a specification.

This invention relates to a machine for harvesting beets and other plants of a like character, which is drawn or propelled parallel to the rows of plants, in order to rapidly pull the beets from the ground, and convey them to a device for removing the tops, then to release them and deliver them to a selected place.

The objects of this invention are first, to provide a grasper which rides on the ground over the row of beets, pressing down upon the soil at the sides of the beets, then grasping the individual beets, pulling them from the soil and holding them while they are raised to a topper; and second, to provide a topper coöperating with the grasper so that the tops of the beets are removed, after being released by the grasper; and third to provide details of structure, whereby an efficient, durable, easily manipulated machine, certain in operation is obtained.

Figure 1:
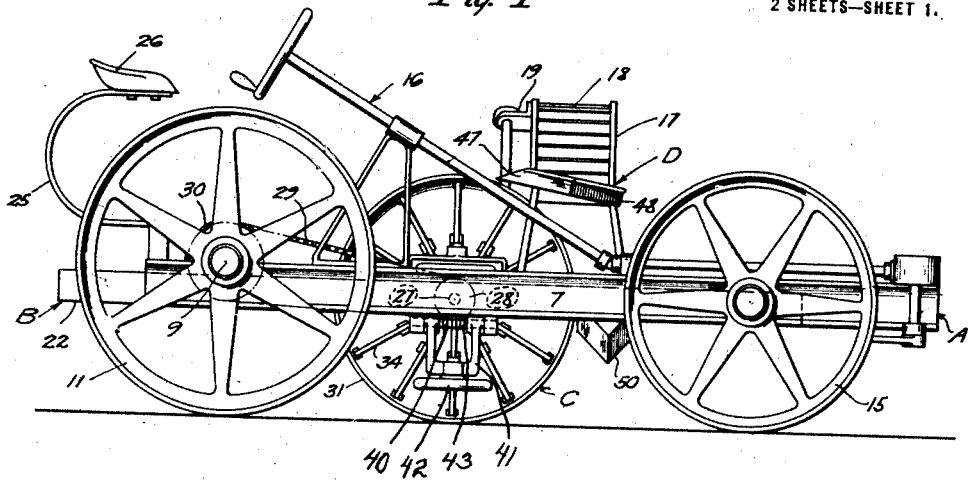
Figure 2:
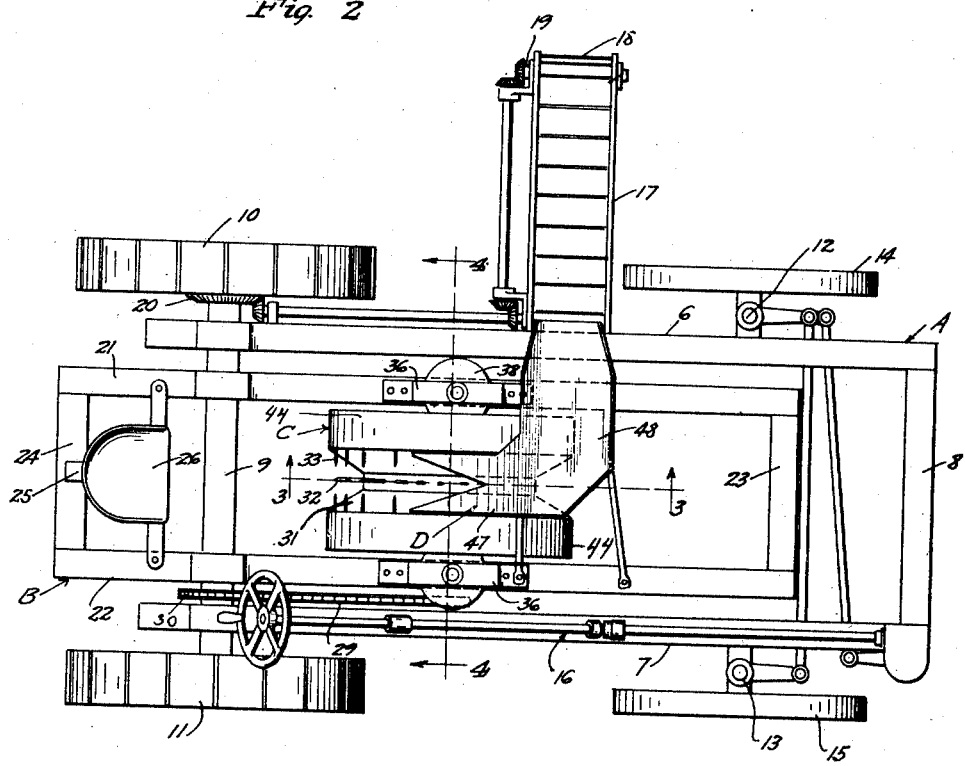
Figure 3:
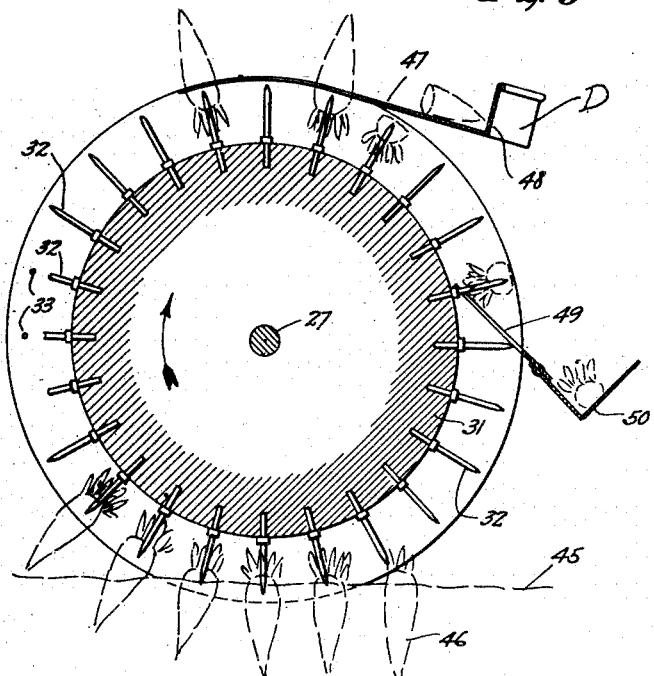
Figure 4:
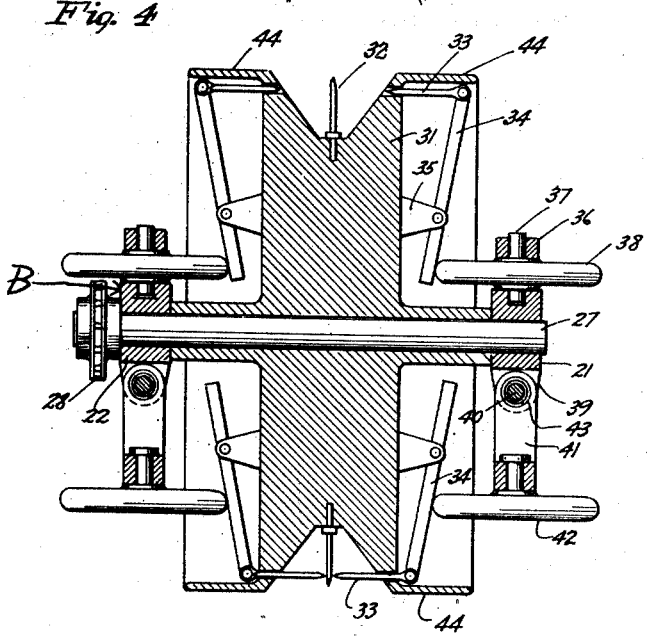
Figure 5:
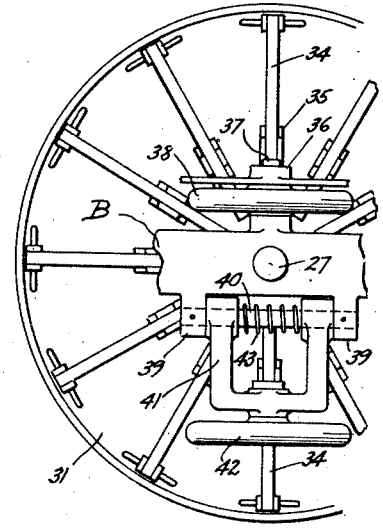

These objects are accomplished by means of the embodiment of my invention illustrated in the accompanying drawing, in which:

Figure 1 is a side elevation of a beet harvester; Fig. 2 is a plan view; Fig. 3 is an enlarged section showing the grasper taken on the line 3—3 of Fig. 2; Fig. 4 is an enlarged section taken on the line 4—4 of Fig. 2; and Fig. 5 is a fragmentary side elevation of the structure shown in Fig. 4.

Referring more particularly to Figs. 1 and 2, a chassis is indicated by A. Mounted upon the chassis is a frame B, which carries the grasper C. The topper is indicated generally by D.

Referring more particularly to the chassis A, it includes a frame comprising side bars 6 and 7 joined by a front bar 8. Journaled upon the side bars adjacent the rear end thereof is an axle 9 having fixed to the ends thereof ground wheels 10 and 11. Mounted adjacent the front ends of the side bars are steering knuckles 12 and 13, upon the spindles of which are mounted the front ground wheels 14 and 15. The steering mechanism of the type usual in automobiles is indicated generally by 16.

Secured to the side bar 6 at about the center thereof is an elevator chute 17, in which operates an endless conveyer belt 18. The conveyer belt is moved by means of a shaft 19 operated through suitable shaft and gearing from a bevel gear 20 fixed to the axle 9. Upon rotation of the ground wheels 10 and 11, shaft 9 will be rotated and motion transmitted to the conveyer belt 18 through the gearing.

Referring more particularly to frame B, it includes side bars 21 and 22 journaled upon shaft 9. Side bars 21 and 22 are connected at the front by a bar 23 and at the rear by a bar 24. Supported by means of a spring 25 upon the frame adjacent the rear thereof is a seat 26 for the operator of the machine, and his weight serves to counterbalance a portion of the moment of the front part of the frame B.

Journaled in the side bars 21 and 22 adjacent the center thereof is a shaft 27. Fixed to the shaft 27 is a sprocket wheel 28, which is driven by a chain 29 passing over a sprocket wheel 30 fixed to the shaft 9. Fixed to the shaft 27 at the center thereof is a grasper.

Referring more particularly to Figs. 3, 4, and 5, the grasper comprises a sheave 31 formed with a groove having a number of radially projecting spikes 32 spaced at comparatively small intervals. Upon each side of the sheave adjacent the outer edges are apertures in which are slidably disposed tines 33 for projection into and retraction from the groove. The tines and mechanism for operating the same are the same for both sides of the sheave and those for one side will be described. Each tine 33 is secured to an arm 34 which is pivotally secured to a bracket 35. Mounted upon the top of a side bar is a bearing 36, in which is vertically disposed a spindle 37, upon which is mounted a roller 38 for engaging the inner ends of the arms 34, so as to rock the latter and withdraw the tines from the groove. Secured to the under side of a side bar is a bearing 39, in which is fixed a shaft 40. Journaled upon the shaft 40 is a yoke 41 having a bearing for a spindle carrying a roller 42. The roller 42 is so disposed that it engages the outer portions of the arms 34 to project the tines 33 into the groove. In order to provide for a resilient bearing of the roller 42 upon the arms 34 so as to accommodate the latter to hard objects which the tines will not penetrate, a spring 43 is mounted upon the shaft 40 and engaged with the yoke to hold the roller 42 against the arms, and yet permit the roller to be forced outwardly. The sheave wheel rides upon the ground, and in order to protect the arms 34, shrouds 44 extend laterally to cover the same.

Referring particularly to Fig. 3, the surface of the ground in which are growing beets is indicated by 45. The beets are indicated by 46. As the sheave wheel rides over the row of beets, the tines 33 approach the beets in retracted position. The wheel is pressed over the beets, then the arms 34 are engaged by the rollers 42, and the tines are forced into the beets penetrating the same. The spikes 32 will also have penetrated some of the beets from the top. A beet is grasped by the tines and then pulled from the ground, as shown in Fig. 3, the wheel rotating in the direction of the arrow. As the beet reaches its upper position, the rollers 38 rock the arms 34 so that the tines are withdrawn, and the beet is carried along by the spikes 32 against the edges of the bootjack shaped knife 47, and the top cut therefrom. It then slides downwardly into the chute 48, from which it is delivered to the elevator or conveyer belt 18. The tops are carried downwardly by the spikes and pulled therefrom by a fork 49, falling into a chute 50, from which they are discharged to the ground.

The frame B permits the grasper to ride upon the ground and to maintain contact with the soil. The spikes 32 insure that the beets will be carried to the topping device. The harvester may be drawn by horses, tractors or any other suitable power. If desired the harvester may be self propelled.

What I claim is:

1. In a beet harvester, a grasper comprising a grooved sheave adapted to ride on the ground, tines for penetrating the beets laterally slidable into and out of the groove of said sheave on both sides thereof, and means to project said tines into said groove when adjacent the ground and to retract said tines after leaving the ground position.

2. In a beet harvester, a grasper comprising a grooved sheave adapted to ride on the ground, tines for penetrating the beets laterally slidable into and out of the groove of said sheave on both sides thereof, arms secured to said tines, said arms being pivotally secured to said sheave on the sides thereof, and means for engagement with said arms to project said tines into said groove when adjacent the ground and to retract said tines after leaving the ground position.

3. In a beet harvester, a grasper comprising a grooved sheave adapted to ride on the ground, tines laterally slidable into and out of the groove of said sheave, arms secured to said tines, said arms being pivotally secured to said sheave and radially disposed thereon, a lower roller for engagement with said arms to project said tines into said groove when adjacent the ground, and an upper roller for engagement with said arms to retract said tines after leaving the ground position.

4. In a beet harvester, a grasper comprising a grooved sheave adapted to ride on the ground, tines laterally slidable into and out of the groove of said sheave, arms secured to said tines, said arms being pivotally secured to said sheave and radially disposed thereon, a lower roller resiliently held against said arms to project said tines into said groove when adjacent the ground, and an upper roller for engagement with said arms to retract said tines after leaving the ground position.

5. In a beet harvester, a grasper comprising a grooved sheave adapted to ride on the ground, tines laterally slidable into and out of the groove of said sheave, means to project said tines into said groove when adjacent the ground and to retract said tines after leaving the ground position, and radially extending spikes in said groove to spear the beets.

6. In a beet harvester, the combination of a grasper comprising a grooved sheave adapted to ride on the ground, tines laterally slidable into and out of the groove of said sheave, and means to project said tines into said groove when adjacent the ground and to retract said tines after leaving the ground position; and a knife having stationary jaws disposed to engage and top the beets upon retraction of said tines.

7. In a beet harvester, the combination of a grasper comprising a grooved sheave adapted to ride on the ground, tines laterally slidable into and out of the groove of said sheave, means to project said tines into said groove when adjacent the ground and to retract said tines after leaving the ground position, and radially extending spikes in said groove to spear the beets; a knife having stationary jaws disposed to engage and top the beets upon retraction of said tines; and means to disengage the tops from said spikes.

In witness that I claim the foregoing I have hereunto subscribed my name this 20th day of October, 1919.

JOSEPH E. WYCKOFF.